United States Patent
Lieberman et al.

(10) Patent No.: US 11,816,613 B2
(45) Date of Patent: Nov. 14, 2023

(54) SYSTEM AND METHOD FOR ADAPTIVE AND DYNAMIC PRICING OF SELF-STORAGE STORAGE UNITS

(71) Applicant: VERITEC SOLUTIONS, Belmont, CA (US)

(72) Inventors: Warren Lieberman, Belmongh, CA (US); Jim Mullin, Palo Alto, CA (US)

(73) Assignee: VERITEC SOLUTIONS, Belmont, CA (US)

( * ) Notice: Subject to any disclaimer, the term of this patent is extended or adjusted under 35 U.S.C. 154(b) by 0 days.

(21) Appl. No.: 17/089,598

(22) Filed: Nov. 4, 2020

(65) Prior Publication Data

US 2021/0103872 A1    Apr. 8, 2021

Related U.S. Application Data

(63) Continuation of application No. 14/595,135, filed on Jan. 12, 2015, now abandoned.

(51) Int. Cl.
*G06Q 10/0631* (2023.01)
*G06Q 10/087* (2023.01)
(Continued)

(52) U.S. Cl.
CPC ..... *G06Q 10/06315* (2013.01); *G06Q 10/087* (2013.01); *G06Q 30/0633* (2013.01); *H04L 67/10* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 7,881,986 B1 * | 2/2011 | Pape | G06Q 10/087 705/28 |
| 8,463,665 B1 * | 6/2013 | Pape | G06Q 10/087 705/28 |

(Continued)

OTHER PUBLICATIONS

Zaihua et al, Design and Implementation of Real Estate Information Management System Based on GIS, 2013 (Year: 2013).*

(Continued)

*Primary Examiner* — Mohamed N El-Bathy
(74) *Attorney, Agent, or Firm* — Dergosits & Noah LLP

(57) ABSTRACT

A computer-implemented method for dynamically pricing available storage units based on desirability is described. A server computer accesses a data storage storing a storage unit inventory for a particular facility. Each storage unit in the storage unit inventory is pre-assigned to a pricing group and provided a desirability rank. In response to a trigger for generating an updated sales plan for the particular facility (or for all facilities in a company), the server computer obtains an available storage unit inventory by deducting the unavailable storage units from the storage unit inventory and orders the available storage units within each pricing group by each unit's desirability rank. The server computer then assigns each of the available storage units to one of a plurality of pricing tiers within the pricing group according to the desirability rank order and generates an updated sales plan containing the available storage unit inventory grouped by the pricing group and by the pricing tiers.

21 Claims, 7 Drawing Sheets

(51) Int. Cl.
   *G06Q 30/0601*   (2023.01)
   *H04L 67/10*   (2022.01)
   *H04L 67/1097*   (2022.01)

(56) References Cited

U.S. PATENT DOCUMENTS

| | | |
|---|---|---|
| 9,547,878 B1 * | 1/2017 | Kerr .................... G06Q 10/02 |
| 2004/0186787 A1 | 9/2004 | Brown et al. |
| 2007/0075136 A1 | 4/2007 | Jacob |
| 2014/0136377 A1 * | 5/2014 | Taylor ................ G06Q 10/087 |
| | | 705/28 |

OTHER PUBLICATIONS

Cechin et al., Real Estate Value at Porto Alegre City Using Artificial Neural Networks (Year: 2000).*

Qiu et al., A Bilevel Analytical Model for Dynamic Storage Pricing in a Supply Hub in Industrial Park (SHIP) (Year: 2015).*

DOMICO—DOMICO Software—Aug. 9, 2013, pp. 1-2 https://web.archive.org/web20130809081618/http://www.domico.com/products/index.html Captured: Feb. 4, 2016.

SiteLink Web Edition >> Overview—Oct. 9, 2013, p. 1 https://web.archive.org/web20131009082717/http://www.sitelink.com/web-edition/overview Captured: Feb. 4, 2016.

Self Storage Management System—Jul. 28, 2013, pp. 1-2 https://web.archive.org/web20130728183458/http://syrasoft.com/home/Page/ID/8 Captured: Feb. 4, 2016.

* cited by examiner

300

| | |
|---|---|
| Accessing a data storage comprising a storage unit inventory for all rental units existing at a particular facility | 302 |
| Obtaining an available storage unit inventory by deducting unavailable storage units from the storage unit inventory | 304 |
| Re-ranking each available storage unit within their pre-assigned pricing groups based upon a storage unit's initial desirability ranking, except those storage units that have been locked | 306 |
| Assigning each of the available storage units to one of a plurality of pricing tiers within each of the pricing groups according to the rank order of the available storage units in the re-ranking or according to the storage unit's locked pricing tier | 308 |
| Generating an updated sales plan | 310 |

FIGURE 3

| Regular Units | | | Deluxe Unit | | | Best Value Unit | | | Standard Unit | | |
|---|---|---|---|---|---|---|---|---|---|---|---|
| Unit Description | UG | Promo | Rent It Now: Paid til 2/29 | Monthly Preferred Price | Unit | Rent It Now: Paid til 2/29 | Monthly Preferred Price | Unit | Rent It Now: Paid til 2/29 | Monthly Preferred Price | Unit |
| 5x5 | 5x5 R | 99% | $13.20 | $55.99 | 102 | $12.02 | $50.99 | 155 | $10.84 | $45.99 | 192 |
| 5x10 drive up | 5x10 R | 50% | $55.15 | $75.99 | 399 | $51.53 | $70.99 | 441 | $47.17 | $64.99 | 603 |
| 5x10 first floor | 5x10 R | 99% | $16.51 | $70.00 | 201 | $15.56 | $65.99 | 415 | $14.62 | $61.99 | 619 |
| 5x10 floor 2+ | 5x10 R | 99% | | | | $14.38 | $60.99 | 403 | $13.20 | $55.99 | 711 |
| 10x10 | 10x10 R | 0% | $136.05 | $110.99 | 17 | $126.25 | $102.99 | 97 | $120.12 | $97.99 | 127 |
| 10x15 | 10x15 R | 99% | $33.01 | $139.99 | 561 | $154.44 | $125.99 | 669 | $27.35 | $115.99 | 845 |

FIGURE 4

SYSTEM AND METHOD FOR ADAPTIVE AND DYNAMIC PRICING OF SELF-STORAGE STORAGE UNITS

CROSS-REFERENCE TO RELATED APPLICATIONS

This application is a continuation application, which claims the benefit of U.S. patent application Ser. No. 14/595,135, filed on Jan. 12, 2015, the contents of which are incorporated herein by reference in their entireties.

FIELD

The present invention relates generally to a computer implemented method and system for periodically updating a pricing structure and, more specifically, to dynamically pricing self-storage storage units based on availability and desirability.

BACKGROUND

The majority of a self-storage company's revenue comes from the rental sales of storage units. The rental rates for storage units are conventionally based on a combination of their physical attributes. For pricing purposes, units with a similar set of physical attributes may be grouped together. Such a grouping of units may be referred to as a pricing group or unit type. For example, a self-storage facility might define a pricing group to consist of storage units that are 10'×10', climate controlled, and close to the front of the building. All storage units assigned to this pricing group would have the same monthly rate. This rate could be different than the rate charged for a different pricing group consisting of storage units that are similarly sized and climate-controlled, but are further from the front of the building. Generally, the composition of storage units assigned to a pricing group remains relatively static, although the monthly rental rate for a pricing group may be changed frequently.

Recently, property management companies, such as Sitelink, WebSelfStorage, and Storage Commander, have been able to provide self-storage companies with software that will periodically adjust the pricing of the storage units based on a set of guidelines. For instance, a storage facility may automatically set a price increase for all storage units on the weekends because a majority of move-ins take place on the weekends. Alternatively, the storage facility may automatically set the move-in price of a pricing group to increase once the percentage of units that are occupied in the pricing group has reached a certain level.

However, these pricing strategies have drawbacks. The current static and periodic pricing methods do not accurately price storage units based on how a potential customer perceives the desirability of an available storage unit as the availability of storage units within a pricing group varies. It is the assumption that if the pricing of each storage unit within a pricing group is more closely correlated with a desirability value of each available storage unit, relative to the other units that are also available, then profit margins can be increased.

Therefore, it is natural that each self-storage company attempts to establish an optimal pricing strategy to attain the maximum possible revenue for each available storage unit. For cases in which too many storage units within a pricing group are rented at a low price, a self-storage company may run a risk of losing revenue from customers who would be willing to pay a higher price for storage units based on storage unit characteristics that provide the customer some convenience or are otherwise perceived by the customer to be more desirable. On the other hand, if the self-storage company rejects too many customers who are willing to forego convenience or other characteristics that make an available-for-rent unit more desirable in order to pay a lower price, they run the risk of not renting available storage units and earning lower revenues.

As the foregoing illustrates, what is needed in the art is a computer implemented method and system that provides a dynamic pricing method for a set of storage units within a pricing group based on availability and desirability to attain the maximum expected value from all storage units.

BRIEF DESCRIPTION OF THE DRAWINGS

The present invention is illustrated by way of example and not limitation in the figures of the accompanying drawings, in which like references indicate similar elements, and in which:

FIG. 3 illustrates a flow diagram of method steps for dynamically pricing each of the available storage units within a self-storage facility when some of the available storage units are locked into a pricing tier according to an embodiment of the present invention.

FIG. 4 illustrates a screenshot with a document image of a sales plan displayed in a browser application window according to an embodiment of the present invention. FIG. 4 displays three Pricing Tiers within a Pricing Group (Deluxe, Best Value, and Standard)

DETAILED DESCRIPTION

Figure 1:
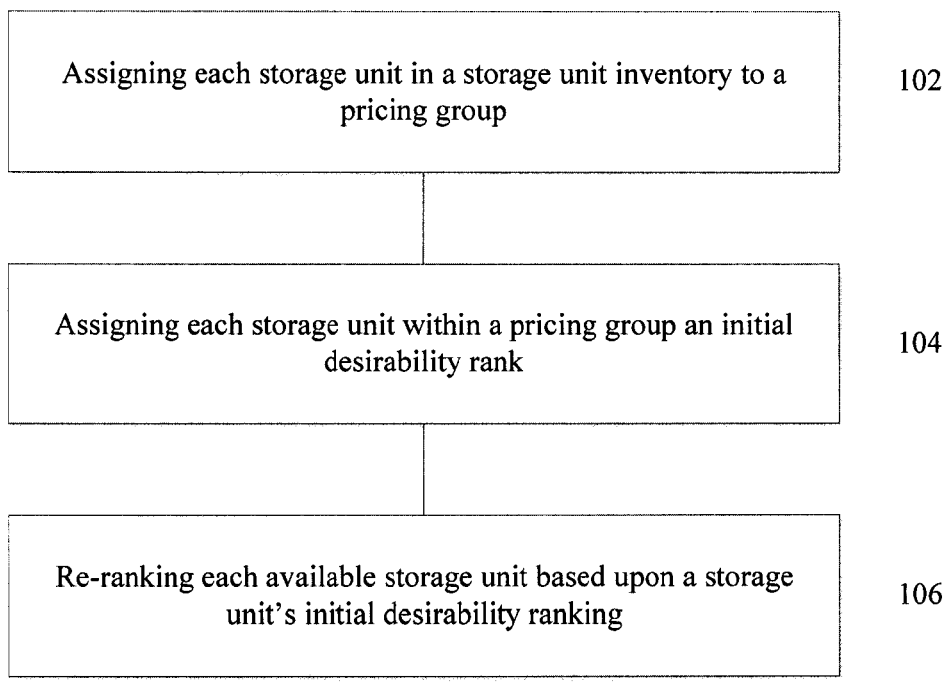
FIG. 1 illustrates a flow diagram of method steps for determining a desirability ranking of available storage units within a storage facility according to an embodiment of the present invention.

It should be appreciated that the present invention can be implemented in numerous ways, including as a process, an apparatus, a system, a device, a method, or a computer readable medium such as a computer readable storage medium comprising computer program instructions or a computer network wherein computer program instructions are sent over optical or electronic communication links. Applications, software programs or computer readable instructions may be referred to as components or modules. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

SUMMARY OF THE INVENTION

The present invention is directed towards a computer implemented method and system for dynamically and differentially pricing available storage units that are in the same pricing group based on the relative desirability of the available storage units. The pricing is provided in a sales plan that can be displayed on a client computer, printed or imported into another software platform used by the self-storage facility.

According to an example embodiment, a set of storage units having similar physical dimensions are assigned to a pricing group and ranked based on the desirability of each storage unit. The current available inventory of storage units is determined and the available storage units are ordered by each storage unit's desirability ranking. Then, each currently available storage unit is assigned to one of a plurality of pricing tiers within the pricing group based on the rank order of the storage units. Within a pricing group, units assigned to the same pricing tier have the same rental rate. The pricing tier to which a unit is assigned will vary depending on which other units in the pricing group are available. With a pricing group, the pricing tier containing the most desirable units that are available will generally have a price that is higher than the pricing tier to which the next most desirable units are assigned. For ease of understanding, we term the pricing tier with the lowest rate the Standard Pricing Tier, although other terminology can be used. As availability of the storage units changes, each available storage unit may be re-assigned to one of the plurality of pricing tiers.

In an illustrative example, Tables 1 and 2 demonstrate re-assigning pricing tiers to storage units based on the availability and desirability rank of the storage units. In this example, a single pricing group of storage units at a storage facility comprises a total of 9 storage units. Of the 9 storage units, 3 storage units are available for rent. Each of the 3 available storage units is assigned to a pricing tier, as shown in Table 1.

TABLE 1

| Unit # | Status    | Desirability Rank | Tier Assigned |
|--------|-----------|-------------------|---------------|
| A      | Occupied  | 1                 |               |
| B      | Occupied  | 2                 |               |
| C      | Available | 3                 | Deluxe        |
| D      | Occupied  | 4                 |               |
| E      | Available | 5                 | Best Value    |
| F      | Occupied  | 6                 |               |
| G      | Occupied  | 7                 |               |
| H      | Available | 8                 | Standard      |
| I      | Occupied  | 9                 |               |

In the event storage unit A becomes available and storage unit H becomes occupied, storage units A, C and E will become the currently available storage units. The pricing tiers, previously assigned to storage units C, E and H, will be re-assigned to the currently available storage units A, C and E, as shown in Table 2.

TABLE 2

| Unit # | Status    | Desirability Rank | Old Tier   | New Tier   |
|--------|-----------|-------------------|------------|------------|
| A      | Available | 1                 |            | Deluxe     |
| B      | Occupied  | 2                 |            |            |
| C      | Available | 3                 | Deluxe     | Best Value |
| D      | Occupied  | 4                 |            |            |
| E      | Available | 5                 | Best Value | Standard   |
| F      | Occupied  | 6                 |            |            |
| G      | Occupied  | 7                 |            |            |
| H      | Occupied  | 8                 | Standard   |            |
| I      | Occupied  | 9                 |            |            |

The re-assignment of the pricing tiers is based on the rank order of storage units A, C and E. In this example, the desirability rank for storage units A, C and E is {1, 3, 5}, making the rank order of available storage units A, C and E {1, 2, 3}, from the most desirable available storage unit to the least desirable available storage unit within the pricing group. Storage unit A, being the most desirable with a desirability rank of 1, will be assigned to the deluxe pricing tier. Storage unit B, being the most desirable storage unit not ranked in the deluxe pricing tier and having a desirability rank of 3, will be assigned to the best value pricing tier. And, storage unit C, being the least desirable with a desirability rank of 5, will be assigned to the standard pricing tier.

DETAILED DESCRIPTION OF THE INVENTION

Definitions

Sales plan: A dynamic report that describes the pricing strategy for storage units within a storage facility, wherein the price of each storage unit in a pricing group is based on the number of available storage units in that pricing group and/or the desirability of each available storage unit. The plan can be output to a user interface at a client computer, integrated with another software platform used by the self-storage facility or printed.

Pricing Group: A set of storage units having the similar attributes.

Desirability of a Storage Unit: Desirability of a storage unit is based on the amenities associated with each storage unit within a pricing group. Amenities may include location, accessibility, door type, physical condition, and the like. For example, a storage unit that requires navigating one turn from a main hallway may be more desirable than another storage unit in the same pricing group that requires navigating three turns from the main hallway. The desirability of a storage unit in a pricing group within a self-storage facility is relative to the other storage units in the same pricing group within the self-storage facility.

Desirability Ranking: A ranking of all storage units within the same pricing group based on each storage unit's desirability. The desirability ranking is static although such rankings may change if units are added to or removed from the pricing group. Also, over time, new information may be received that results in revising the desirability ranking of units within a pricing group. In general, unless requested by an employee of the self-storage facility, or there are changes at the facility, such as adding or removing units, or adding or removing physical amenities to units, the desirability ranking of each storage unit does not change.

Rank Order of Available Storage Units: An ordering of available storage units according to the desirability ranking of the storage units. The rank order is used to assign each storage unit to a pricing tier. The rank order of the available storage units is dynamic and changes as the availability of the storage units at the storage facility changes. In some embodiments, some of the units in a pricing group are locked into a pricing tier and these units are assigned to a specific pricing tier regardless of the rank order of the other available storage units.

Pricing Tier: A set of tiers within a pricing group at progressively increasing price points. Each pricing group includes a set of pricing tiers.

Storage Unit Inventory: Data comprising a listing of all storage units within a storage facility, wherein each storage unit is pre-assigned to a pricing group and given a desirability rank. In some instances, some storage units may be pre-assigned or locked into a pricing tier.

Availability Data: Data concerning the current occupancy status of the storage units located at a storage facility.

THE PREFERRED EMBODIMENTS

According to the present invention, a Value Pricing System (VPS) is provided that is capable of dynamically pricing available storage units within a self-storage facility based on a desirability ranking of each available storage unit, and providing a sales plan that segregates the available storage units into pricing tiers within pricing groups. Prior to dynamically pricing available storage units within a self-storage facility, each storage unit within the self-storage facility must be ranked based on their desirability. FIG. 1 illustrates a flow diagram of method steps for determining a desirability ranking of available storage units within a storage facility, according to one embodiment of the invention.

The method 100 begins at step 102, where each storage unit, in a storage unit inventory for all storage units existing at the storage facility, is assigned to a pricing group. In one embodiment, a self-storage facility device assigns each storage unit within the self-storage facility to a pricing group based on the physical dimensions and other common attributes of the storage units. For example, all storage units that have a length of 5 feet, a height of 10 feet and a width of 10 feet and that are not climate controlled, may be assigned to the same pricing group.

At step 104, each of the storage units within a pricing group is given a desirability rank. The desirability rank of each storage unit is relative to the other storage units within the same pricing group. In other words, the desirability rank of a storage unit is the position of the storage unit in a sorted list of all the storage units within the same pricing group. In one embodiment, the storage units may be ranked manually; for example, by an employee of the storage facility. In another embodiment, the storage units may be ranked automatically according to predefined ranking criteria. Examples of predefined criteria that may be measured are "physical distance from an access point" and "drive-up accessibility". Rules can be created to associate units with these criteria and then the criteria used to automatically generate the desirability rank for each of the units.

The desirability rank of each unit is static. In other words, unless an employee of the storage facility requests an adjustment to the desirability ranking, or storage units are added to, or deleted from the pricing group, or there are material physical changes to a unit, the desirability ranking for the storage units within a pricing group will remain the same throughout repeated updates of the sales plan by the VPS.

In certain circumstances, it may be advantageous to always assign certain units in a pricing group to a specific pricing tier; typically, this will be the highest pricing tier. For example, access to a particular unit may be sufficiently desirable such that regardless of the desirability rank assigned to the unit, and irrespective of whatever other units in the pricing group are available, that specific unit should always be assigned to the highest pricing tier of the pricing group. In such cases, these storage units may be decidedly "locked" into to a specific pricing tier and should be ranked higher than the other storage units within the same pricing group. The desirability ranking of all the storage units within the pricing group may be adjusted to account for the locked storage units.

In one embodiment, the adjustment to the desirability ranking of the storage units is accomplished by moving up the desirability ranking of any storage units with a locked designation that is ranked below another storage unit that is not locked within the pricing group. The desirability ranking of the other storage units in the same pricing group are revised accordingly.

An example of an adjusted ranking is illustrated below in Table 3.

TABLE 3

| Storage Unit ID | Desirability Ranking | Locked Designation | Adjusted Desirability Ranking |
| --- | --- | --- | --- |
| A1 | 1 | 1 | 1 |
| A2 | 2 | 0 | 4 |
| B1 | 3 | 1 | 2 |
| B2 | 4 | 0 | 5 |
| B3 | 5 | 0 | 6 |
| C1 | 6 | 1 | 3 |
| C2 | 7 | 0 | 7 |

In this example, storage units A1, B1 and C1 have a desirability ranking of 1, 3 and 6 and are designated as "locked", wherein a Locked Flag=1. The desirability ranking for A1, B1 and C1 is adjusted such that A1, B1 and C1 are ranked higher than A2, B2, B3 and C2, the storage units that are not designated as "locked". The adjusted desirability ranking for A1, B1 and C1 then becomes 1, 2, and 3. The desirability ranking of storage units A2, B2, B3 and C2 are also adjusted accordingly.

In one embodiment, adjusting the desirability ranking may be accomplished by performing a double sort on all the storage units in a particular pricing group and assigning an adjusted desirability rank starting with 1 to the top storage unit and incrementing the rank by 1 for each storage unit following it in the sorted list. The double sort comprises a first sort of the storage units that were locked in ascending order of desirability rank and then a second sort of the desirability ranking of all the available "unlocked" storage units in ascending order. In another embodiment, the ranking may be determined using any feasible ranking order algorithm.

In another example, the desirability ranking may be adjusted when an employee of the storage facility changes the desirability ranking of a particular storage unit, adds a new storage unit to the pricing group, deletes a storage unit from the pricing group, or there are material physical changes made to one or more of the units that impact their desirability. The desirability ranking is adjusted to account for the changes. For example, Table 4 illustrates an adjustment to the desirability ranking after the ranking of one of the storage units is changed.

TABLE 4

| Storage Unit ID | Desirability Ranking | Changes to the Desirability Ranking | Adjusted Desirability Ranking |
| --- | --- | --- | --- |
| A | 1 | 1 | 1 |
| B | 2 | 2 | 3 |
| C | 3 | 3 | 4 |
| D | 4 | 4 | 5 |
| E | 5 | 1.5 | 2 |
| F | 6 | 6 | 6 |

In this example, six available storage units, A through F, are listed and have a desirability ranking of 1-6, respectively. An employee of the storage facility may want to change the desirability ranking of storage unit E to be the second highest ranked storage unit within the pricing group. To that end, the employee would modify the desirability rankings using fractional values because the desirability ranking for storage unit E would have to be a value between 1 and 2 to make it the second highest ranked storage unit. The desirability ranking for storage unit E is therefore changed to 1.5, a value between 1 and 2. The desirability ranking of all the storage units within the pricing group is adjusted such that all the adjusted desirability ranking values are integer values.

If there has been an adjustment to the desirability ranking of storage units within a pricing group, the adjusted desirability ranking replaces the desirability ranking of storage units within the pricing group prior to the ordering of available units and the creation of a sales plan by the VPS rank ordering engine.

At step 106, as part of the creation of the sales plan, all the storage units that are currently available within the pricing group are ordered by each storage unit's desirability rank. In one embodiment, only available storage units within the pricing group that are not assigned a "locked" designation are ordered and assigned to a pricing tier.

In a preferred embodiment, a self-storage facility device stores, in a memory associated with the self-storage facility device, the pricing group and the desirability ranking of each storage unit located in a storage facility in a storage unit inventory (results of Steps 102-104); and a server computer such as the VPS server accesses, from the memory associated with the self-storage facility device, the currently available storage unit inventory and orders the available storage units within their pricing group by each storage unit's desirability rank (Step 106). Based on the rank order of the available storage units, the server computer can dynamically assign each of the available storage units within the storage facility to a pricing tier within the pricing groups.

The dynamic pricing process is invoked when the VPS server computer receives a request for an updated sales plan of currently available storage units from a self-storage facility, or from its corporate office. In one embodiment, an employee of the self-storage facility may request the updated pricing structure via a user interface associated with the self-storage facility device. In another embodiment, updates to the sales plan for currently available storage units at the self-storage facility may be automatic. For example, updates may be scheduled to occur regularly each day. In such an embodiment, the dynamic pricing process will be invoked by setting a trigger to automatically run the dynamic pricing process regularly.

Figure 2:
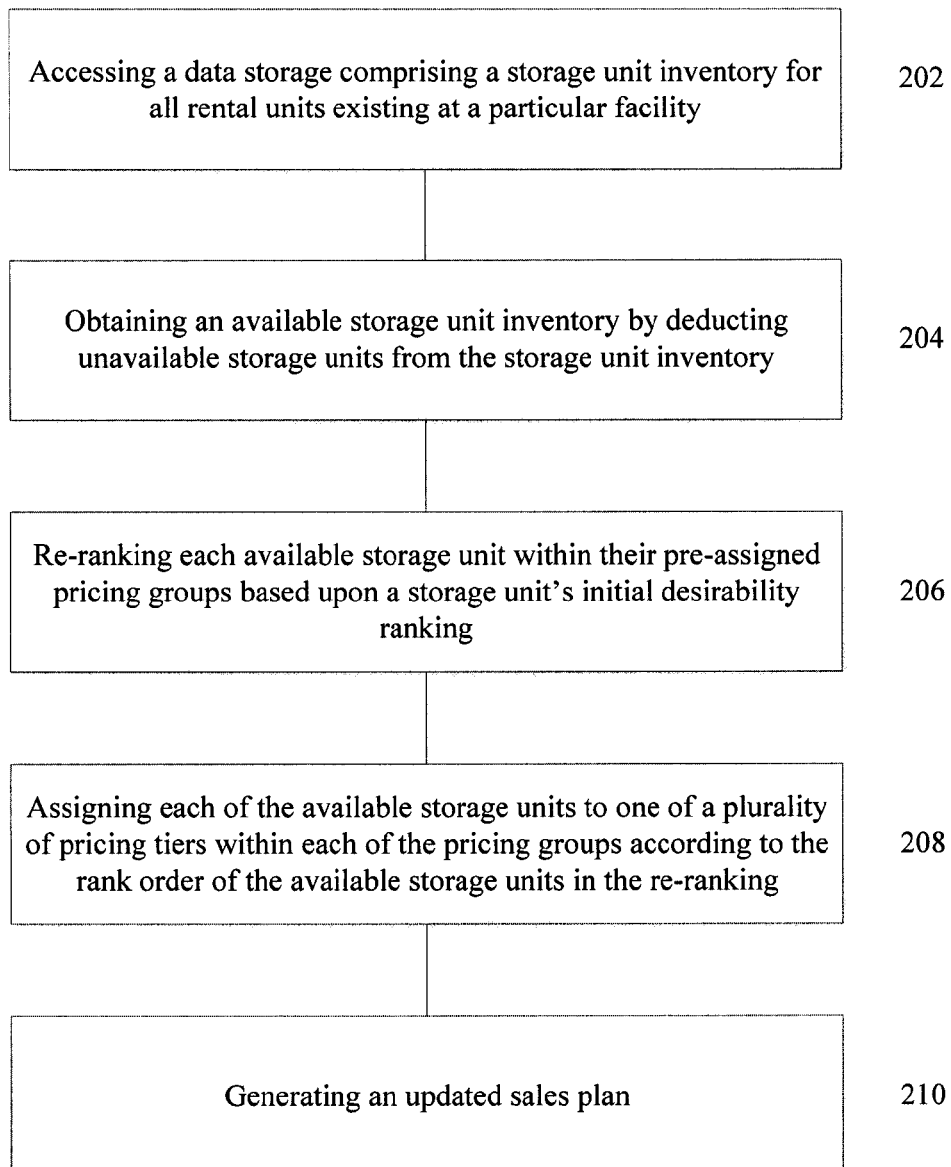
FIG. 2 illustrates a flow diagram of method steps for dynamically pricing available storage units within a storage facility according to an embodiment of the present invention.

Once invoked either by manual request or automatic request, the dynamic pricing process may begin to generate a sales plan. FIG. 2 illustrates a flow diagram of method steps for dynamically pricing all of the available storage units within a pricing group, according to one embodiment of the invention.

The method 200 begins at step 202, where the VPS server computer accesses a data storage on which a storage unit inventory for all storage units existing at a particular facility has been stored. Each storage unit in the storage unit inventory has been pre-assigned to a pricing group and given a desirability rank within its pre-assigned pricing group. The data storage also contains data on the current availability of the storage units.

In one embodiment, the storage unit inventory may be stored in a memory associated with a local self-storage facility device or in a memory associated with a corporate server operated by or on behalf of the self-storage facility. The VPS server computer may access the memory of the associated self-storage facility through remote database access protocols, relational or non-relational databases (such as SQL Server, etc.), APIs, messaging, web services and other protocols, or the like. In another embodiment, the storage unit inventory may be managed by a third party self-storage data management service, such as SiteLink, CenterShift, Syrasoft, and Domico. The VPS server computer may access the storage unit inventory using hardware/software technology to interface seamlessly with the third party self-storage management software and pull the required inventory data associated with the self-storage facility.

In yet another embodiment data concerning the storage unit inventory may be stored in a memory associated with the VPS server computer. The VPS server computer may then access data stored in a memory associated with the self-storage facility to obtain availability data for all of the storage units at the self-storage facility.

At step 204, the VPS server computer obtains an available storage unit inventory for the particular facility on a specific date by deducting unavailable storage units from the stored storage unit inventory.

At step 206, a rank ordering engine associated with the VPS server orders the available storage units within their pre-assigned pricing groups by each storage unit's desirability rank.

At step 208, a pricing engine associated with the VPS server computer assigns each of the available storage units to one of a plurality of pricing tiers within each of the pricing groups according to the rank order of the available storage unit. In one embodiment, other factors are used in conjunction with the rank order to assign each of the available storage units to a pricing tier. For example, assignment of a plurality of available storage units within a pricing group to a plurality of pricing tiers may be based on the rank order of the storage unit within the pricing group as well as the total number of storage units within the pricing group.

In one embodiment, the ordered available storage units are assigned to one of three pricing tiers: a standard pricing tier, a best value pricing tier and a deluxe pricing tier. The standard pricing tier relates to the currently advertised low price of the storage units, the best value pricing tier relates to a slightly higher price of the storage units, and the deluxe pricing tier relates to the highest price of the storage units within the pricing group. Those skilled in the art can appreciate that the number and names of the pricing tiers may vary based on the needs of a specific storage facility.

As part of the generation of the sales plan, in one embodiment, the pricing engine component of the VPS may assign a predefined number of storage units to a standard pricing tier. The predefined number may be an absolute number or a percentage of the total number of available units. Once a set of available storage units are assigned to the standard pricing tier, the remaining available storage units may be divided and assigned to the best value pricing tier and the deluxe pricing tier, according to their rank order of step 206.

In some circumstances, it may be desired to assign only a few units to the standard pricing tier at any one time. This allows for a majority of the available storage units within a pricing group to be classified in a higher pricing tier such as the best value pricing tier or the deluxe pricing tier. Classifying most of the available storage units in higher pricing tiers allows a storage facility employee to focus their sales pitch of available storage units in higher pricing tiers to inquiring customers while simultaneously ensuring that the self storage facility is able to provide a competitive standard price for those customers who are primarily price-driven rather than service-oriented when choosing their self-storage unit.

In another embodiment, the pricing engine may assign pricing tiers to the storage units by partitioning the available storage units within a pricing group based on preset guidelines and assigning each storage unit within a partition to the same pricing tier. For example, storage units A-F have a rank order of {1, 2, 3, 4, 5, 6}. Based on preset guidelines requiring the storage units to be equally distributed amongst three pricing tiers when six units are available, storage units A and B, having the highest rankings of 1 and 2, will be assigned to pricing tier 1; storage units C and D, having a ranking of 3 and 4, will be assigned to pricing tier 2; and storage units E and F, having the lowest rankings of 5 and 6, will be assigned to pricing tier 3.

Although not necessary as part of the sales plan, the pricing engine may also determine an order of available storage units within each pricing tier to create an offer order. The offer order may specify an order in which to offer the available storage units to a customer. For example, a pricing tier has 3 storage units with the rank order of 4, 5 and 6. An offer order may specify that the unit with a rank of 4 should be offered first, the unit with the rank of 5 should be offered second, and the unit with the rank of 6 should be offered third. The offer order may differ by pricing tier. For example, when a standard unit is offered, it may be the least desirable of the standard units. When a deluxe unit is offered, however, it may be the most desirable of the deluxe units.

Finally, at step 210, the VPS server computer generates as an output an updated sales plan containing the available storage unit inventory categorized by the pricing group and by the pricing tiers within the pricing group. This output may be sent back to the requesting facility for display and may be integrated with existing management software. The existing management software may use the information contained in the sales plan in various ways by the requesting facility. For example, existing management software may extract information from the sales plan to display only the pricing information for selected individual storage units on a website.

FIG. 2 illustrates a flow diagram for dynamically pricing the available storage units by periodically updating the assignment of each available storage unit to a pricing tier as the availability of the storage units at the self-storage facility changes. However, circumstances may arise where it is not desirable to dynamically assign all the available storage units to a pricing tier. For example, it may not be desirable to dynamically assign all the available storage units when at least one storage unit has been locked into a specific pricing tier. In such a circumstance, the module assigning storage units to a pricing tier, when dynamically assigning each of the available storage units within a self-storage facility to a pricing tier, must exclude the available storage units designated as "locked" into a specific pricing tier.

FIG. 3 illustrates a flow diagram of method steps for one such method for dynamically pricing each of the available storage units within a self-storage facility when some of the available storage units are locked into a pricing tier, according to one embodiment of the invention.

The method 300 begins at step 302, where the VPS server accesses a data storage on which a storage unit inventory for all the storage units existing at a particular facility has been stored. Each storage unit in the storage unit inventory is pre-assigned to a pricing group and is provided with a desirability rank within its pre-assigned pricing group. Some of the storage units are also locked into a specific pricing tier within their respective pricing group.

At step 304, in response to a request (manually or automatically entered) for an updated sales plan for a specific date at the particular facility, the VPS server computer obtains an available storage inventory by deducting the unavailable storage units from the storage unit inventory.

At step 306, a rank ordering engine associated with the VPS server computer orders the available storage units within their pre-assigned pricing group, except those storage units that have been locked into a specific pricing tier for a pricing group. The ordering is based upon the available storage unit's desirability rank. In one embodiment, a locked designation is provided for any storage unit that is available but should not be included in the dynamic pricing process.

At step 308, a pricing engine associated with the VPS server assigns each of the available storage units to one of a plurality of pricing tiers within the pricing group according to the rank order of the available storage unit or, if it is a locked unit assigned to a specific pricing tier, according to the storage unit's locked pricing tier.

At step 310, the VPS server computer generates an output of an updated sales plan containing the available storage unit inventory grouped by the pricing group and by the pricing tiers within the pricing groups. This output may be communicated to the requesting party, and in some embodiments, delivered to a property management software platform used by the storage facility for display and printing.

Exemplary Embodiment

In an exemplary embodiment, the VPS may initiate a core algorithm to dynamically price available storage units within a self-storage facility based on desirability rank.

Table 5 describes several of the key parameters and variables used within the core algorithm. Those skilled in the art can appreciate that there are variety of parameters that are not shown below but may be used to implement the core algorithm.

TABLE 5

| ID | Description | Illustrative Values | Notes |
|---|---|---|---|
| PG | Pricing Group | Length × Width × Height × Climate Controlled | The grouping of units at a location. For example, two groupings could be 10 × 10 × Regular × Y, 15 × 10 × Small × N. |
| VPTIn | Input Pricing Tier | 0-4 | The existing "Pricing Tier" values . . . For this example, these are as follows: 0 = Irregular 1 = Economy 2 = Standard 3 = Best Value 4 = Deluxe |
| VPTOut | Value Pricing Tier Output | 0-4 for Available units | Negative values indicate not set yet or Non-Available units |
| UnitStatusID | Current availability status of a unit at the storage facility | 0, 1, 2, 3, 4, 5, 6, 7, 99 | 0 = available, 1 = occupied, 2 = reserved, 3 = maintenance, 4 = company unit, 5 = in-process-vacating, 99 = other-unavailable |
| UnitTypeDesc | Unit type description of a unit at the storage facility | S, P, C, M, W, U | The unit type description describes the type of unit that is for rent. For example, 'S' is "self-storage," 'P' is "Parking," etc. |
| Num_Avail | Number of available/Ready Units | >=0 | Total within PG with UnitStatusID = 0 (available). Units with other UnitStatusID codes are not included. |
| Num_ARB | Number of available storage units that are pre-assigned to a pricing tier and available to rent | >=0 | Total within PG after locked (available) units and lower 2 tiers are removed. |
| Tot_Units | Total number of units | >=Num_Avail | Total within PG (includes occupied, damaged, etc.) |
| VPTLocked | Storage unit locked to top VPTOut level | 1, 0 | A locked flag = 1. Locked storage units will be set to the Deluxe pricing tier (4). |
| Condition | Storage unit Condition | 0, 1, 2, 3 | 0 = "OK", 1 = minor issue, 2 = more major issue, 3 = unrentable |
| DR_IN | Input Desirability Ranking | 1 . . . Tot_Units | Best to worst unit within PG (initially based on the field audit). |
| DR_OUT | Output Desirability Ranking | 1 . . . Tot_Units | Best to worst unit within PG (output from module based on update rules) |
| DR_AVG | In PG, mean value of DR_OUT | 1 . . . Tot_Units | Average calculated across storage units "avail to rebalance" (in Num_ARB) |
| MAU | Minimum Available storage units | >=1 | Threshold value for Num_ARB, below which special conditions may apply |
| DR_T4_PCT | Factor for Min Top Tier DR | 0%-100% | Used in conjunction with DR_AVGunit to qualify for top VPTOut level |
| T2 | Target num of storage units with VPTOut = 2 | >=1 | Will vary by Num_Avail within PG |
| A3_PCT | Target Alloc % to VPT = Best Value | 0%-100% | Target allocation of "free" storage units within PG to VPT = 3 |
| A4_PCT | Target Alloc % to VPT = Deluxe | (100% - A3_PCT) | Target allocation of "free" storage units within PG to VPT = 4 |

Once the VPS accesses a storage unit inventory which contains the data for the available units and/or the desirability rankings for each of the storage units located at a storage facility, the VPS may initiate the core ranking algorithm to assign each available storage unit to a pricing tier.

Table 6 describes the default settings for the parameters requiring values The default settings may change based on the needs and preference of a self-storage facility.

TABLE 6

| Parameter | Default Setting | Comment |
|---|---|---|
| MAU | 4 | "Sparse" conditions below MAU may have special rules |
| DR_T4_PCT | 80% | Ensures Deluxe storage units are above average desirability |
| A3_PCT | 60% | Determines target mix between Best Value and Deluxe |
| NMIN1 | 4 | Min threshold for numarb = 1 special case |
| NMIN2 | 8 | Max threshold for numarb = 1 special case |
| B | 80% | B % value for numarb = 1 special case |

In this embodiment, the steps of the core algorithm include:

1) For each pricing group, set the Value Pricing Tier Output (VPTOut) value to −1 for all the storage units.

2) For each pricing group, determine the availability of the storage unit:
   Set the VPTOut to −2 if the current status of a unit is occupied, reserved, or a company unit
   Set VPTOut=−3 if current status of a storage unit is damaged
   Set VPTOut=−4 if current status of a storage unit is one of these (5=vacating, 6=on order, 7=sold, 99=suspended)
   Set VPTOut=−5 if the unit is not a storage unit
   Set VPTOut=4 if current status of a storage unit is available and locked
3) For each storage unit within pricing group that is available,
   Set the VPTOut to 0 if the Input Pricing Tier (VPTIn) was initially 0
   Set the VPTOut to 1 if the Input Pricing Tier (VPTIn) was initially 1
3a) Set VPTOut to −99 for all units where VPTOut is still −1
4) Initialize values for the following storage unit categories metrics as follows:
   Number of available storage units (Num Avail)=sum of storage units where the storage units were available
   Total Number of Units (Tot_Units)=the total number of storage units in pricing group
   Total number of storage units available after the locked storage units and the lower 2 tiers are removed (Num_ARB)=sum of storage units where VPTOut is currently equal to −99. This means storage units already set to be 0 or 1 based on VPTIn or units set to be 4 based on storage units that are locked to the Deluxe pricing tier (VPTLocked) are not included in this total.
   Average number of storage units calculated across the storage units in Num_ARB (DR_AVG)=(sum of adjusted desirability ranking (DR_OUT) across all storage units where VPTOut is currently equal to −99) divided by (Num_ARB)
5) Determine Intermediate Values called Alloc2, Alloc3, and Alloc4:
   Alloc2=min(Target number of storage units with VPTOut=2 (T2 from Tables 7 and 8 below), Num ARB)
   If Num_ARB=0, then Alloc3=0, Alloc4=0
   Else Alloc3=Ceiling (Target allocation of "free" units within the pricing group to VPT=3 (A3_PCT)*Num_ARB-Alloc2)); and Alloc4=Num_ARB-Alloc3-Alloc2
6) For each storage unit within the pricing group with VPTOut=−99, in descending order of DR_OUT:
   Do until Alloc2=0
     VPTOut=2, decrement Alloc2
   Do until Alloc3=0
     VPTOut=3, decrement Alloc3
   Do until Alloc4=0
     VPTOut=4, decrement Alloc4
7)
   Since at this point, all "available and ready" units (Unit_Status=0) in the pricing group should be assigned an initial VPTOut level, a value of −99 means that there is an issue in the algorithm.

The core algorithm may further include the following steps when special conditions arise, such as sparse conditions:

Sparse conditions (Num_ARB<=MAU):

TABLE 7

| Num_ARB | T2 Setting | VPTOut Settings |
|---|---|---|
| 1 | 1 | 2 |
| 2 | 1 | 2, 3 |
| 3 | 1 | 2, 3, 4* |
| 4 | 2 | 2, 2, 3, 4* |

Non-sparse conditions (Num_ARB>MAU):

TABLE 8

| Num_ARB | T2 Setting | Comments |
|---|---|---|
| 5-6 | 2 | Use core algorithm |
| 7-8 | 3 | |
| 9-11 | 4 | |
| 12-15 | 5 | |
| 16-19 | 6 | |
| 20+ | 7 | |

A check is implemented to determine if the VPTOut assignments are in an acceptable desirability ranking range:
   Any unit with:
      i. VPTOut=4
      ii. DR_OUT>(DR_AVG)*(DR_T4_PCT)
   Set VPTOut=3
   Note that in the "sparse" conditions where there are 3 or 4 units to be assigned, the units will be assigned as described in the table; however, when the above condition is checked, a storage unit that was initially assigned VPTOut=4, may be revised to VPTOut=3.

In this embodiment, the VPS outputs the following data once the core algorithm has determined pricing tiers for each available storage unit within a storage unit facility:

TABLE 9

| Output | Description |
|---|---|
| DR_OUT | These values are used in the algorithm and are also an output so that subsequent edits to the initial desirability rankings by staff can be made in between runs of the core algorithm |
| VPTOut | The "new" pricing tier calculated and assigned to available storage units |
| OfferOrderOut | A value for each available storage unit that will be used to indicate the ordering of units on the sales plan. The number of units displayed on the plan may vary by VPTOut and may not reflect all available units. The storage facility may determine these settings. It is expected that between 1-5 storage units per pricing group and VPTOut are displayed in the sales plan, depending on availability. In a preferred embodiment, the following number of available storage units is recommended for the sales plan |

TABLE 9-continued

| Output | Description |
|---|---|
| | 1-2 listings for Standard units (VPTOut = 2) |
| | 2-3 listings for Best Value units (VPTOut = 3) |
| | 2 listings for Deluxe units (VPTOut = 4) |
| | 0-2 listings for Irregular or Economy units |
| | (VPTOut = 0 or 1) |
| | These settings assume that those quantities or more are available within each of those pricing tiers. If there are actually less, they could all be shown on the Sales Plan. If there are more, than the additional units would be "hidden", as described further below. The information contained in the sales plan may vary based on preferences and operational needs of the storage facility. |
| Reassignment Order | The order that units should be downgraded from one pricing tier to the next lower tier if the VPS is not called dynamically by the PMS (for example in those situations where it is not feasible to call the VPS dynamically in real-time). |

If all units with VPTOut=2 for a location and PG are rented before the next run of the core algorithm, the storage facility may choose to call the VPS to update the VPTOut values for that specific storage facility. The requirements for this stored procedure call are as follows:
(1) The call will trigger an update for a single location, but all PG's will have their VPTOut values updated (and also DR_OUT and OfferOrderOut).
(2) In some circumstances, depending on the needs of a storage facility, the number of calls made should be minimized. For scenarios where there are no remaining units with VPTOut=2 available but there are also a limited number (i.e., 1-3) of total units available, the storage facility may strategically choose to not call for the update.
(3) Prior to the call, the storage unit inventory should be updated by the storage facility with the latest available data.
(4) The storage facility should have a default process in place in the event that the VPS is not able to respond in the required timeframe. For example, if only a single unit is available, the default may be to assign the available unit to best value. If more than 1 unit is available, the default may be to assign the unit with lowest available desirability to standard and all others to best value. Other default methods may be defined.

The outputs from the core algorithm are used to generate a sales plan for the available storage units. The sales plan will update a listing of available storage units by VPTOut after a rental transaction occurs at the store. The sales plan will include the OfferOrderOut for all available units in the pricing group and the VPTOut, even though only a subset may be listed at any particular time. The units in each "PG+VPT" would be ordered based on a set of rules, such as: Randomized Order, Best to Worst DesirabilityRank_OUT, Worst to Best DesirabilityRank_OUT, and the like.

FIG. 4 illustrates a screenshot with a document image of sales plan displayed in a browser application window. The sales plan displays a plurality of pricing groups 401, the pricing tiers 402 within each pricing group, and the storage units within each pricing group 401. For example, units D0114, D0102, D0043, D0112, D0108, D0066, D0039 and D0057 all belong to the pricing group 8×10-Climate Controlled [80 SF]. Within the 8×10-Climate Controlled pricing group, the prices for each of the storage units are varied based on which pricing tier the storage units belong to. For example, storage units D0114 and D0102 belong to the Deluxe pricing tier; storage units D0043, D0112, and D0108 belong to the Best Value pricing tier; and storage units D0066, D0039 and D0057 belong to the Standard pricing tier. Storage units D0114 and D0102 are the most desirable storage units within their respective pricing groups. Therefore, they have been assigned to the "deluxe" pricing tier and are priced the highest. Storage units D0043, D0112, and D0108 are the most desirable storage units within their respective pricing groups that are available and not assigned to the deluxe pricing tier. Therefore, they have been assigned to the "best value" pricing tier and are priced less than storage units D0114 and D0102. Storage units D0066, D0039 and D0057 are the least desirable storage units within the pricing group 8×10-Climate Controlled [80 SF] and are therefore assigned to the "standard" price tier.

In this embodiment, each pricing tier 402, is also associated with a price 404. Each storage unit within a pricing tier will be priced the same. For example, storage units D0114 and D0102, belonging to the Deluxe pricing tier of the 8×10-Climate Controlled pricing group, will both be priced at $229.99.

Hardware

Machine Based Architecture

Figure 5:
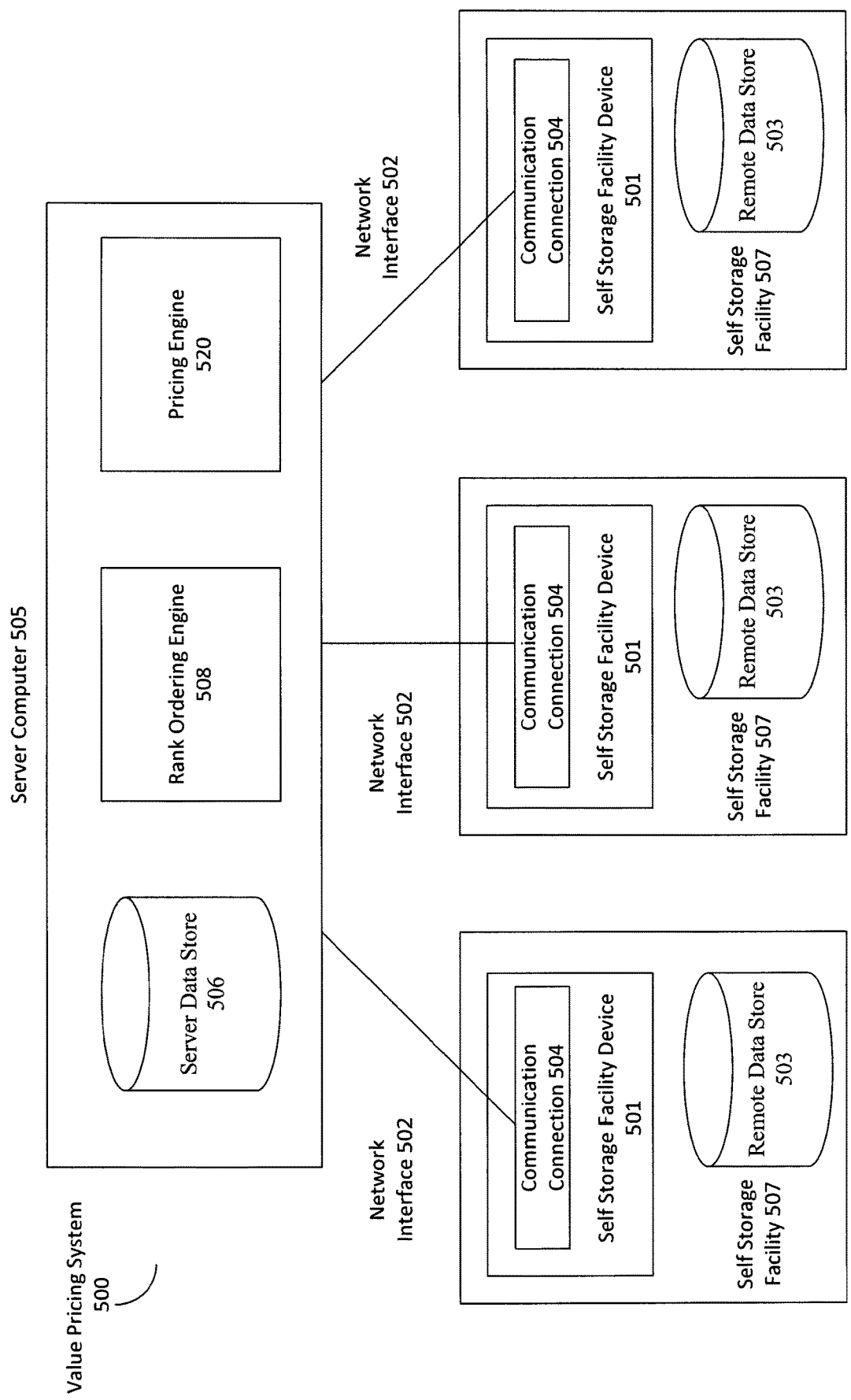
FIG. 5 illustrates a block diagram of a value pricing system wherein a server computer is operatively connected to a set of self-storage facility devices according to an embodiment of the present invention.

With reference to FIG. 5, a block diagram of an embodiment of a Value pricing system (VPS) 500 configured to implement at least one aspect of the invention is illustrated. The VPS 500 is network based in that a plurality of self-storage facility devices may be coupled to a server computer 505 logically through a network interface 502 and then physically connected via a communication connection 504. The self-storage facility device may be any form of a remote computer or computing device.

The network interface 502 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, Digital Subscriber Lines (DSL), and any other technologies that are used to implement Internet (optical fiber, routers, back-bone networks, etc) and cellular network connections (for example 4G, LTE, etc).

Communication connection(s) 504 refers to the hardware/software employed to connect the network interface 502 to the each self-storage facility device 501. The communication connection 504 can be internal or external to the self-storage facility device 501. The hardware/software necessary for connection to the network interface 502 includes, for exemplary purposes only, internal and external technologies such as, modems including regular telephone grade modems, cable modems and DSL modems, ISDN adapters, Ethernet cards, cellular modems, satellite, and other Internet communication technologies (for example, satellite, balloon, electrical transmission lines, etc.).

The VPS 500 includes one or more self-storage facility device 501 associated with a rental storage facility 507. The self-storage facility device 501 can be hardware and/or software (e.g., threads, processes, computing devices). The VPS 500 also includes one or more server(s). The server(s) can also be hardware and/or software (e.g., threads, processes, computing devices). The servers 505 can house threads to perform transformations by employing the present invention, for example. One possible communication between a self-storage facility device 501 and a server 505 may be in the form of a data packet adapted to be transmitted between two or more computer processes. The VPS 500 includes a communication framework that can be employed to facilitate communications between the self-storage facility device 501 and the server computer 505. The self-storage facility device 501 is operably connected to one or more remote data stores 503 that can be employed to store information local to the rental storage facility 504.

Self-Storage Facility

A self-storage facility 507 includes a self-storage facility device 501 and one or more remote data store 503. The self-storage facility device 501 is operably connected to one or more remote data stores 503 and can be employed to enter, store and manage storage unit data. The self-storage facility device 501 may be any form of a remote computing device. In one embodiment, the self-storage facility device 501 may be a mobile computing device such as a smart phone, PDA, tablet, lap-top or the like.

Each self-storage facility device 501 uses a communication connection 504 to transmit data to a server computer 505 via a network interface. Thus, the self-storage facility device 501 may transmit data to the server computer.

Figure 5A:
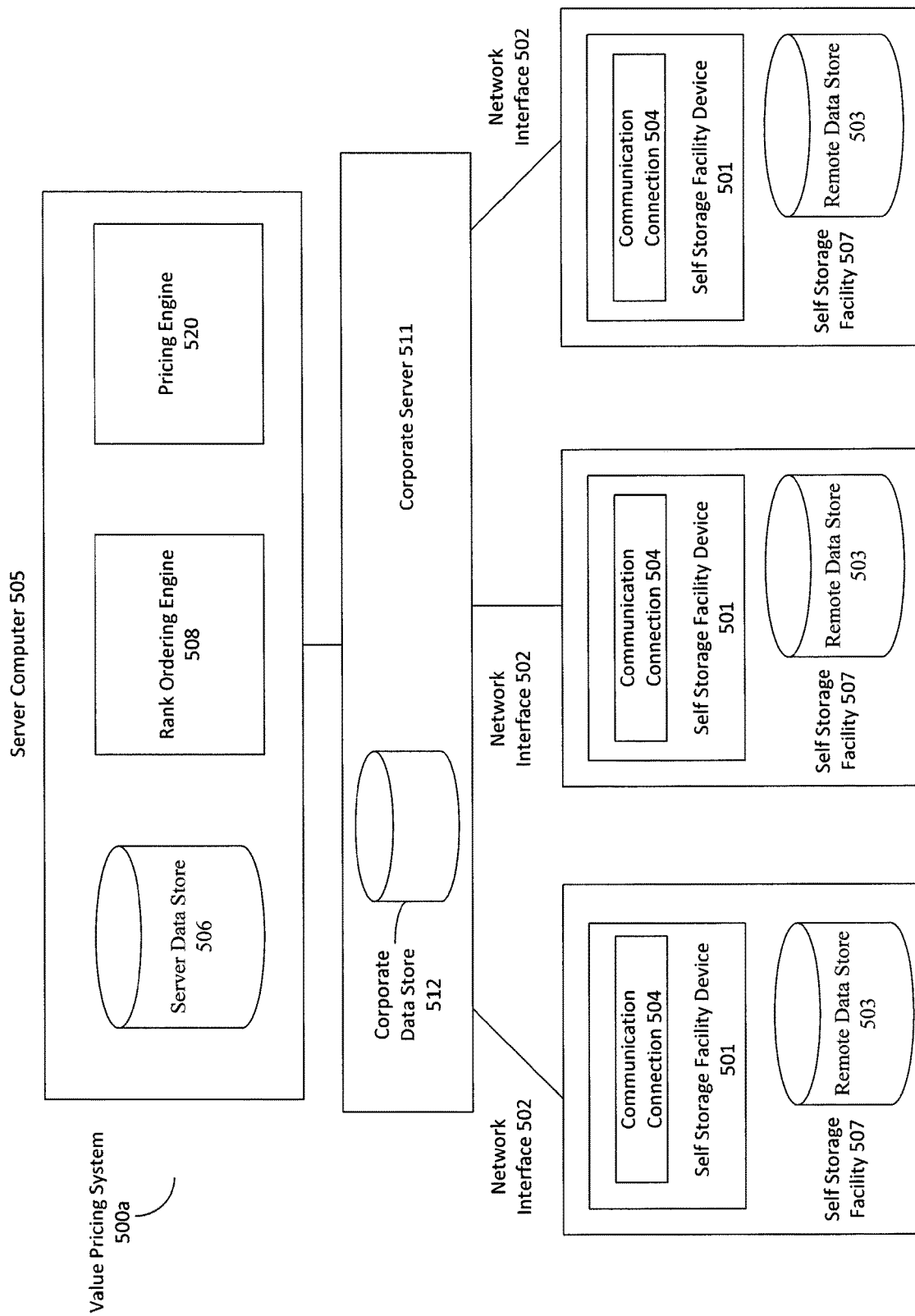
FIG. 5A illustrates a block diagram of a value pricing system, wherein a server computer is operatively connected to a corporate server associated with a set of self-storage facility devices according to an embodiment of the present invention.

In another embodiment, the VPS 500a, as illustrated in a block diagram in FIG. 5A, includes one or more self-storage facilities device 501 each connected to a corporate server 511 through a communication connection 504. Each self-storage facility device may transmit data such as the store unit inventory or availability data to the corporate server.

The corporate server 511 is operably connected to one or more corporate data stores 512 which may be employed to store and manage storage data received from each of the self-storage facility devices. The corporate server 511 may use a communication connection 504 to transmit the data received from each of the self-storage facility devices 501 to a server computer 505 via a network interface.

Server Computer

The server computer 505 is operably connected to one or more server data stores 506 that can be employed to access, store and process information obtained from the self-storage facility device 501 or a corporate server 511 and generate an updated sales plan. In one embodiment, the server computer may be operably connected to a third party self-storage management software (not shown). The server computer may access, store and process information associated with the self-storage facility from the third party self-storage management software, as well as return certain output results to the self-storage management software.

In one embodiment, a self-storage facility device 501 or the corporate server 511 transmits a storage unit inventory for a self-storage facility, including the availability data, to the server computer 505 via a network interface 502. In another embodiment, a self-storage facility device 501 or the corporate server 511 transmits the availability data stored in the remote data store 503 or 512 to the server computer 505, wherein the server computer 505 has the storage unit inventory already stored in the server data store 506.

The server computer 505 may store the received or accessed storage unit inventory and/or availability data in a server data store 506. In one embodiment, the server data store 506 stores the storage unit inventory and/or the availability data and associates each storage unit with the rental storage facility 507. For example, the server computer 505 may process the data and add metadata, tags or the like to indicate the rental storage facility 507 where the storage units reside.

Using the storage unit inventory and/or the availability data, a rank ordering engine 508 obtains an available storage unit inventory and orders each available store unit that is not assigned a "locked" designation based on their desirability rank. The pricing engine 520 accesses the ranking order of available storage units from the rank ordering engine 508 and assigns a pricing tier to each of available storage units.

Once the storage units have been assigned to their respective pricing tiers, the server computer 505 generates and transmits the sales plan to a self-storage facility device 501, another computing device associated with the self storage facility or a corporate server 511 via a network interface 502.

In one embodiment, the sales plan is presented to the self-storage facility device 501 or a corporate server 511 as a graphical user interface on a display device associated with the self storage facility device 501, the another computing device associated with the self-storage facility or the corporate server 511.

In another embodiment, the sales plan may also be accessible or transmitted to a third party computing device (not shown) that is not associated with the self-storage facility or the self-storage corporate entity. For example, the sales plan may be accessed by or transmitted to a computing device used by a commissioned non-company independent sales representative or a machine capable of carrying out a complex series of actions automatically, such as a kiosk. In another example, the sales plan may be accessible or transmitted to a third party sales channel. A third party sales channel may include a web service comparatively advertising available storage units based on prices, such as Sparefoot.com or Storageseeker.com.

Cloud Based Architecture

In one embodiment, a self-storage facility device may communicate with a dedicated cloud server to access a cloud based application for generating a sales plan.

Figure 6:
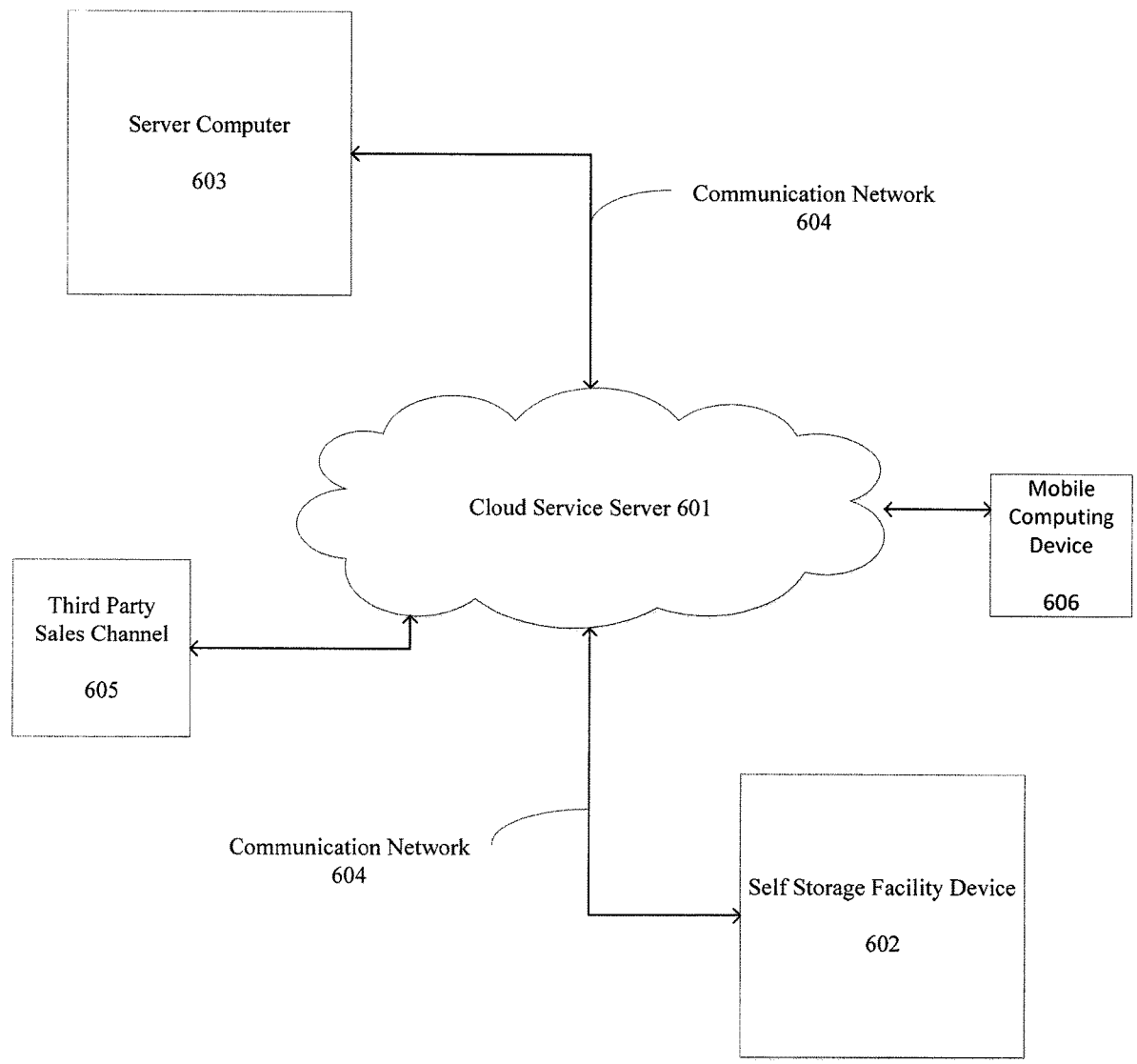
FIG. 6 illustrates a value pricing system implemented using cloud based architecture according to an embodiment of the present invention.

FIG. 6 is a block diagram illustrating conventional architecture for cloud computing.

Web Based Application

In one embodiment, the cloud computing architecture allows for storing and accessing data on a cloud service server 601 by a self-storage facility device 602 and a server computer 603. The cloud service server 601 may service multiple self-storage facility devices 602, each having an account in the cloud service server 601. The self-storage facility device 602 may interact with an API allowing the self-storage facility device to directly store data, such as inventory data and/or availability data, and download data, such as a sales plan, from the cloud service server 601 via a communication network 604 (e.g., Internet).

Once the data is stored on the cloud service server 601, the server computer 603 may access the data from the cloud service server 601 and generate a sales plan as previously described. The server computer 603 may then interact with an API allowing the server computer to store the sales plan to the cloud service server 601; and the self-storage facility device 602 may retrieve the sales plan from the cloud service server 601.

Cloud Based Application

In another embodiment, the self-storage facility device 602 may utilize a cloud based application functioning on the cloud service server 601 to generate a sales plan. The self-storage facility device 602 establishes a connection with the cloud service server 601 through a cloud API and requests an updated sales plan. The cloud based application, upon request for the updated sales plan, is then able to pull data from the self-storage facility device, such as a storage unit inventory, storage unit availability, and/or the like.

In another embodiment, storage unit inventory data and/or availability data may be managed by a third party self-storage management software, such as Sitelink, CenterShift, Syrasoft, Domico, and the like. The cloud service server 601 may use an API and or other hardware and software technology to interface seamlessly with Self-storage management software to pull or access storage unit inventory data and/or availability data associated with the storage facility and return certain output results to the self-storage management software.

Based on desirability ranking information stored in the storage unit inventory and/or the storage unit availability information, the cloud based application functioning on the cloud service server 601 generates a sales plan as described previously. The cloud based application may also push the sales plan to the self-storage facility device via an API.

In one example, the cloud computing could be used to generate a sales plan using a PaaS model. A PaaS model allows cloud providers to deliver a computing platform, typically including operating system, programming language execution environment, database, and web server. The VPS may run software to generate a sales plan on a cloud platform without the cost and complexity of buying and managing the underlying hardware and software layers.

In another example, using a SaaS model, the self-storage facility device may be provided access to application software and databases. The VPS may be installed and operated in the cloud and the self-storage facility devices may have access to the software from the cloud. Cloud applications are different from other applications in their scalability, which can be achieved by cloning tasks onto multiple virtual machines at run-time to meet changing work demand. Load balancers distribute the work over the set of virtual machines. This process is transparent to the cloud user, who sees only a single access point. To accommodate a large number of cloud users, cloud applications can be multi-tenant, that is, any machine serves more than one cloud user organization.

In one embodiment, the sales plan stored on a cloud may be accessible or transmitted to a third party computing device 605 and/or 606 that is not associated with the self-storage facility or the self-storage corporate entity. For example, the sales plan may be accessible to a computing device associated with a third party sales channel 605, a commissioned non-company independent sales representative 606 or automated sales representative 606 through a network interface or an application. The computing device 606 may be a smart phone, PDA, tablet, lap-top, kiosk or the like.

While the foregoing is directed to embodiments of the present invention, other and further embodiments of the present invention may be devised without departing from the basic scope thereof. For example, aspects of the present invention may be implemented in hardware or software or in a combination of hardware and software. One embodiment of the present invention may be implemented as a program product for use with a computer system. The program(s) of the program product define functions of the embodiments (including the methods described herein) and can be contained on a variety of computer-readable storage media. An example of a suitable computing system environment in which the invention may be implemented, although as made clear above, the computing system environment is only one example of a suitable computing environment and is not intended to suggest any limitation as to the scope of use or functionality of the invention. Neither should the computing environment be interpreted as having any dependency or requirement relating to anyone nor combination of components illustrated in the exemplary operating environment.

Computing device typically includes a variety of computer readable media. Computer readable media can be any available media that can be accessed by computer and includes both volatile and nonvolatile media, removable and non-removable media. By way of example, and not limitation, computer readable media may comprise tangible computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data. While communication media includes non-ephemeral buffers and other temporary digital storage used for communications, it does not include transient signals in as far as they are ephemeral over a physical medium (wired or wireless) during transmission between devices. Combinations of any of the above should also be included within the scope of computer readable media. The system memory includes computer storage media in the form of volatile and/or nonvolatile memory such as read only memory (ROM) and random access memory (RAM). The processing unit and bus allow for transfer of information between elements within computer, such as during start-up, typically stored in ROM. RAM typically contains data and/or program modules that are immediately accessible to and/or presently being operated on by processing unit.

The computer may also include other removable/non-removable, volatile/nonvolatile computer storage media include, but are not limited to, magnetic tape cassettes, flash memory cards, digital versatile disks, Blu-Ray disks, digital video tape, solid state RAM, solid state ROM, and the like. The hard disk drive is typically connected to the system bus through a non-removable memory interface such as interface, or removably connected to the system bus by a removable memory interface, such as interface.

The drives and their associated computer storage media discussed above provide storage of computer readable instructions, data structures, program modules and other data for the computer. For example, disk drive is illustrated as storing operating system, application programs, other program modules, and program data. Note that these components can either be the same as or different from operating system, application programs, other program modules, and program data. Operating system, application programs, other program modules, and program data are given different numbers here to illustrate that, at a minimum, they are different copies. A user may enter commands and information into the computer through input devices such as a keyboard and pointing device, commonly referred to as a mouse, trackball or touch pad. Other input devices may include a microphone, joystick, game pad, satellite dish, depth or motion sensor, scanner, or the like. These and other input devices are often connected to the processing unit through the system bus, but may be connected by other interface and bus structures, such as a parallel port, game port, or a universal serial bus (USB). A monitor or other type of display device is also connected to the system bus via an interface, such as a video interface. In addition to the monitor, computers may also include other peripheral output devices such as speakers and printer, which may be connected through an output peripheral interface.

One of ordinary skill in the art can appreciate that a computer or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

In view of the foregoing, the scope of the present invention is determined by the claims that follow.

What is claimed is:

1. A storage facility inventory management method comprising:
   receiving, at a server, a record for each storage unit located in a plurality of storage facilities, each record including identification of a storage unit, identification of a storage facility where the storage unit is located, identification of a pricing group of a plurality of pricing groups assigned to the storage unit, and a desirability rank within the pricing group assigned to the storage unit;
   storing, by the server, the received records for the plurality of storage units in a database associated with the server;
   receiving, at the server, a list of available storage units located in a storage facility of the plurality of storage units as part of a first request to generate updated pricing information for the storage facility, the list of available storage units being received from a storage facility device over a network connection via a selected application programming interface to a third-party local property management software executing on the storage facility device, the third-party local property management software being one of a plurality of third-party local property management software, each third-party local property management software having an application programming interface providing storage unit availability data to the server;
   retrieving, by the server, records of the available storage units located in the storage facility requesting the pricing information from the database associated with the server;
   determining, by the server, a rank order of the available storage units, the rank order being based on the pricing group assigned to each of the available storage units and the desirability rank of each of the available storage units;
   determining, by the server, a pricing tier of a plurality of pricing tiers for each of the available storage units based on a total number of available storage units within each of the pricing groups and the rank order of the available storage units, each of the pricing tiers being associated with a price point;
   identifying, by the server, the selected application programming interface from the plurality of application programming interfaces corresponding to the plurality of third-party local property management software based on the server receiving the list of the available storage units via the selected application programming interface; and
   transmitting, by the server, the updated pricing information for each of the available storage units via the selected application programming interface to the third-party local property management software executing on the storage facility device, the updated pricing information for each of the available storage units including the price points associated with each of pricing tiers, the third-party local property management software displaying a subset of available storage units and associated pricing information on an interface.

2. The method of claim 1, wherein the storage units are assigned to a pricing group based on physical characteristics of the storage units.

3. The method of claim 1, wherein the desirability ranking is a ranking of all storage units within a particular facility and within a particular pricing group based on the desirability of the storage units within the particular facility.

4. The method of claim 1, further comprising:
   receiving, at the server, a second request to generate updated pricing information for the storage facility and a current list of available storage units located in the storage facility;
   retrieving, by the server, records of the currently available storage units located in the storage facility from the database associated with the server;
   determining, by the server, an updated rank order for each of the currently available storage units, the updated rank order being based on the pricing group assigned to each of the currently available storage units and the desirability rank within the pricing group of each of the currently available storage units;
   determining, by the server, an updated pricing tier of the plurality of pricing tiers for each of the currently available storage units based on a current number of available storage units within each of the pricing groups and the updated rank order of each of the available storage units;
   transmitting, by the server via the application programming interface to the local property management software executing on the storage facility device, for each of the currently available storage units, the price points associated with each of pricing tiers.

5. The method of claim 4, wherein at least one of the currently available storage units has been locked into one of the plurality of pricing tiers, wherein the at least one of the currently available storage units is always associated with the price point corresponding to the one of the plurality pricing tiers while locked.

6. The method of claim 5, wherein determining the updated pricing tier further comprises:

determining an updated pricing tier of the plurality of pricing tiers for each of the unlocked currently available storage units based on a current number of available storage units within each of the pricing groups and the updated rank order of each of the available storage units.

7. The method of claim 1 further comprising:
receiving, at the server, at least one of the following updates to the storage facility: an update of a desirability rank associated with a storage unit of one of the plurality of storage facilities, an update that includes a newly added storage unit located in one of the plurality of storage facilities, or an updated that includes a deleted storage unit located in one of the plurality of storage facilities;
updating, by the server, the corresponding records, stored in the database associated with the server, corresponding to the storage facility.

8. The method of claim 1, wherein the updated pricing information for each of the available storage units further includes at least one of the corresponding desirability ranking and the corresponding determined pricing tier.

9. A storage facility inventory management system comprising:
one or more processors; and
a non-transitory computer readable medium storing a plurality of instructions, which when executed, cause the one or more processors to:
receive a record for each storage unit located in a plurality of storage facilities, each record including identification of a storage unit, identification of a storage facility where the storage unit is located, identification of a pricing group of a plurality of pricing groups assigned to the storage unit, and a desirability rank within the pricing group assigned to the storage unit;
store the received records for the plurality of storage units in a database associated with the server;
receive a list of available storage units located in a storage facility of the plurality of storage units as part of a first request to generate updated pricing information for the storage facility, the list of available storage units being received from a storage facility device over a network connection via a selected application programming interface to a third-party local property management software executing on the storage facility device, the third-party local property management software being one of a plurality of third-party local property management software, each third-party local property management software having an application programming interface providing storage unit availability data to the server;
retrieve records of the available storage units located in the storage facility requesting the updated pricing information from the database associated with the server;
determine a rank order for each of the available storage units, the rank order being based on the pricing group assigned to each of the available storage units and the desirability rank within the pricing group of each of the available storage units;
determine a pricing tier of a plurality of pricing tiers for each of the available storage units based on a total number of available storage units within each of the pricing groups and the rank order of each of the available storage units, each of the pricing tiers being associated with a price point;
identify the selected application programming interface from the plurality of application programming interfaces corresponding to the plurality of third-party local property management software based on the server receiving the list of the available storage units via the selected application programming interface; and
transmit the updated pricing information for each of the available storage units via the selected application programming interface to the third-party local property management software executing on the storage facility device, the updated pricing information for each of the available storage units including the price points associated with each of pricing tiers, the third-party local property management software displaying a subset of available storage units and associated pricing information on an interface.

10. The system of claim 9, wherein the storage units are assigned to a pricing group based on physical characteristics of the storage units.

11. The system of claim 9, wherein the desirability ranking is a ranking of all storage units within a particular facility and within a particular pricing group based on the desirability of the storage units within the particular facility.

12. The system of claim 9, the instructions further comprising instructions to:
receive a second request to generate updated pricing information for the storage facility and a current list of available storage units located in the storage facility;
retrieve records of the currently available storage units located in the storage facility from the database associated with the server;
determine an updated rank order for each of the currently available storage units, the updated rank order being based on the pricing group assigned to each of the currently available storage units and the desirability rank within the pricing group of each of the currently available storage units;
determine an updated pricing tier of the plurality of pricing tiers for each of the currently available storage units based on a current number of available storage units within each of the pricing groups and the updated rank order of each of the available storage units;
transmit, via the application programming interface to the local property to the management software executing on the storage facility device, for each of the currently available storage units, the updated price points associated with each of pricing tiers.

13. The system of claim 12, wherein at least one of the currently available storage units has been locked into one of the plurality of pricing tiers, wherein the at least one of the currently available storage units is always associated with the price point corresponding to the one of the plurality pricing tiers while locked.

14. The system of claim 13, wherein determining the updated pricing tier further comprises:
determining an updated pricing tier of the plurality of pricing tiers for each of the unlocked currently available storage units based on a current number of available storage units within each of the pricing groups and the updated rank order of each of the available storage units.

15. The system of claim 9 further comprising:
receive at least one of the following updates to the storage facility: an update of a desirability rank associated with a storage unit of one of the plurality of storage facilities, an update that includes a newly added storage unit located in one of the plurality of storage facilities, or an updated that includes a deleted storage unit located in one of the plurality of storage facilities;

update the corresponding records, stored in the database associated with the server, corresponding to the storage facility.

16. A storage facility inventory management computer program product comprising a non-transitory computer-readable medium having a computer-readable program code embodied therein to be executed by one or more processors, the program code including instructions to:

receive a record for each storage unit located in a plurality of storage facilities, each record including identification of a storage unit, identification of a storage facility where the storage unit is located, identification of a pricing group of a plurality of pricing groups assigned to the storage unit, and a desirability rank within the pricing group assigned to the storage unit;

store the received records for the plurality of storage units in a database associated with the server;

receive a list of available storage units located in a storage facility of the plurality of storage units as part of a first request to generate updated pricing information for the storage facility, the list of available storage units being received from a storage facility device over a network connection via a selected application programming interface to a third-party local property management software executing on the storage facility device, the third-party local property management software being one of a plurality of third-party local property management software, each third-party local property management software having an application programming interface providing storage unit availability data to the server;

retrieve records of the available storage units located in the storage facility requesting the updated sales plan from the database associated with the server;

determine a rank order for each of the available storage units, the rank order being based on the pricing group assigned to each of the available storage units and the desirability rank within the pricing group of each of the available storage units;

determine a pricing tier of a plurality of pricing tiers for each of the available storage units based on a total number of available storage units within each of the pricing groups and the rank order of each of the available storage units, each of the pricing tiers being associated with a price point;

identify the selected application programming interface from the plurality of application programming interfaces corresponding to the plurality of third-party local property management software based on the server receiving the list of the available storage units via the selected application programming interface; and transmit the updated pricing information for each of the available storage units via the selected application programming interface to the third-party local property management software executing on the storage facility device, the updated pricing information for each of the available storage units including the price points associated with each of pricing tiers, the third-party local property management software displaying a subset of available storage units and associated pricing information on an interface.

17. The computer program product of claim 16, wherein the storage units are assigned to a pricing group based on physical characteristics of the storage units.

18. The computer program product of claim 16, wherein the desirability ranking is a ranking of all storage units within a particular facility and within a particular pricing group based on the desirability of the storage units within the particular facility.

19. The computer program product of claim 16, further comprising:

receive a second request to generate updated pricing information for the storage facility and a current list of available storage units located in the storage facility;

retrieve records of the currently available storage units located in the storage facility from the database associated with the server;

determine an updated rank order for each of the currently available storage units, the updated rank order being based on the being based on the pricing group assigned to each of the currently available storage units and the desirability rank within the pricing group of each of the currently available storage units;

determine an updated pricing tier of the plurality of pricing tiers for each of the currently available storage units based on a current number of available storage units within each of the pricing groups and the updated rank order of each of the available storage units;

transmit, via the application programming interface to the local property to the management software executing on the storage facility device, for each of the currently available storage units, the updated price points associated with each of pricing tiers.

20. The computer program product of claim 19, wherein at least one of the currently available storage units has been locked into one of the plurality of pricing tiers, wherein the at least one of the currently available storage units is always associated with the price point corresponding to the one of the plurality pricing tiers while locked; and wherein determining an updated pricing tier further comprises determining an updated pricing tier of the plurality of pricing tiers for each of the unlocked currently available storage units based on a current number of available storage units within each of the pricing groups and the updated rank order of each of the available storage units.

21. The computer program product of claim 16, further comprising:

receive at least one of the following updates to the storage facility: an update of a desirability rank associated with a storage unit of one of the plurality of storage facilities, an update that includes a newly added storage unit located in one of the plurality of storage facilities, or an updated that includes a deleted storage unit located in one of the plurality of storage facilities;

update the corresponding records, stored in the database associated with the server, corresponding to the storage facility.

* * * * *